United States Patent [19]

Sumida

[11] 4,125,022

[45] Nov. 14, 1978

[54] DIGITAL FUEL QUANTITY INDICATORS

[75] Inventor: Shizuo Sumida, Hiroshima, Japan

[73] Assignee: Toyo Kogyo Co., Ltd., Hiroshima, Japan

[21] Appl. No.: 831,165

[22] Filed: Sep. 7, 1977

[30] Foreign Application Priority Data

Sep. 13, 1976 [JP] Japan .................. 51-110505

[51] Int. Cl.$^2$ .................. G01F 23/10
[52] U.S. Cl. .................. 73/313
[58] Field of Search .................. 73/313, 308, 304 R

[56] References Cited

U.S. PATENT DOCUMENTS 3,279,258  10/1966  Stacey .................. 73/313

FOREIGN PATENT DOCUMENTS 26,357   6/1969  Japan .................. 73/313
469,890  8/1975  U.S.S.R. .................. 73/313

Primary Examiner—Donald O. Woodiel
Attorney, Agent, or Firm—Fleit & Jacobson

[57] ABSTRACT

Digital fuel quantity indicator including a fuel quantity sensing device disposed in a fuel reservoir for producing binary signals in accordance with the fuel level. A decoder is provided for receiving the binary signals from the sensing device and producing display signals which are applied to a display tube. The same display tube is utilized to make display of a 10th digit and of a unit digit in accordance with whether the fuel level is above or below 10 unit.

6 Claims, 3 Drawing Figures

U.S. Patent
Nov. 14, 1978
4,125,022
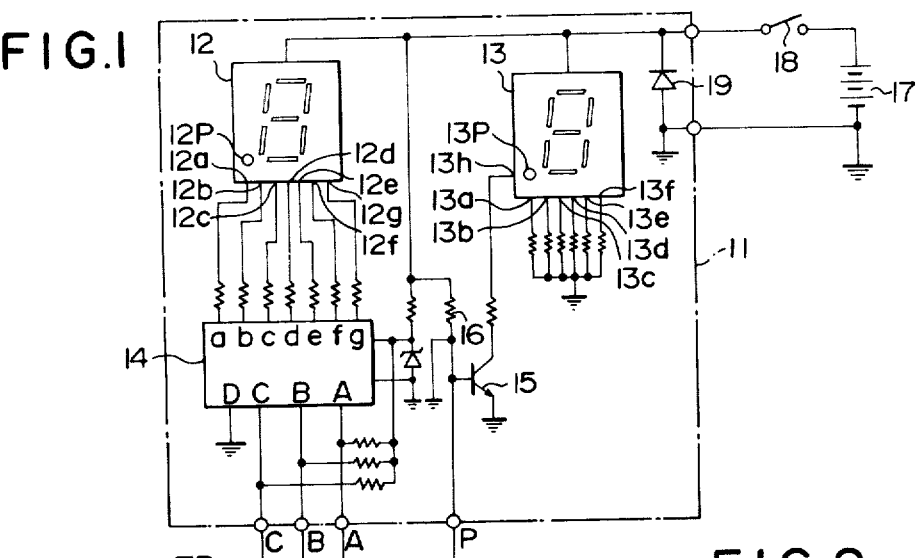
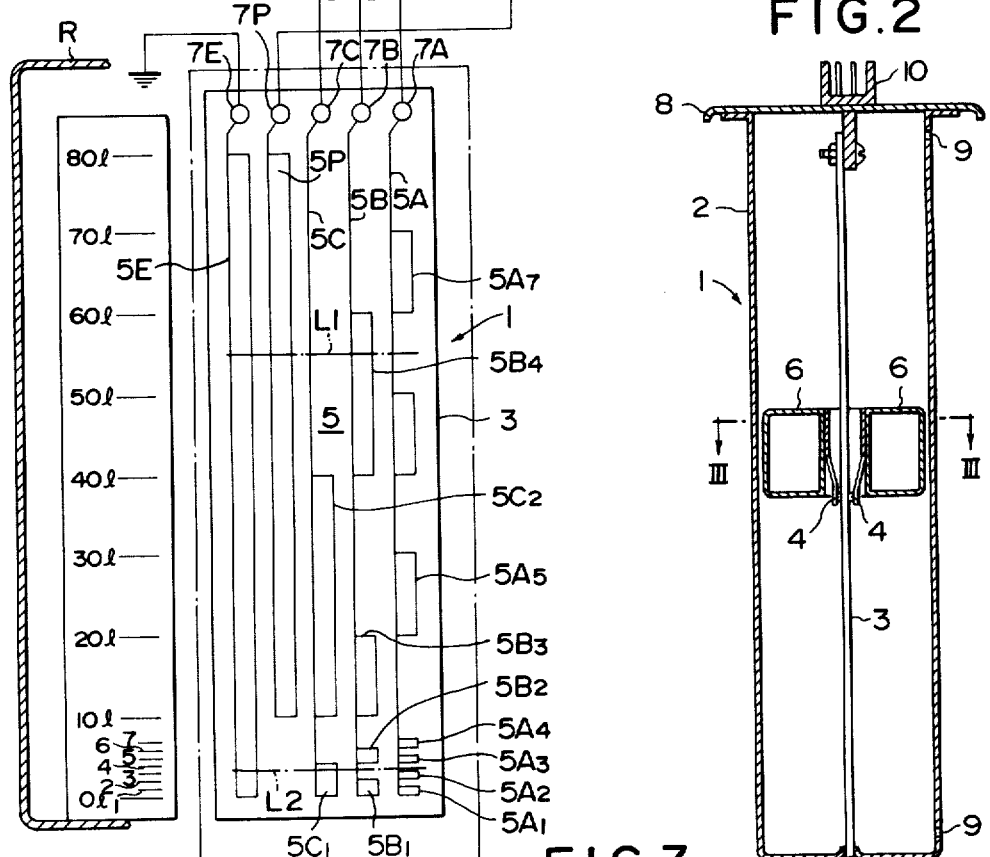
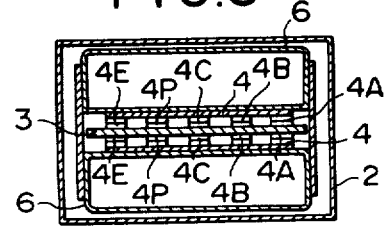

DIGITAL FUEL QUANTITY INDICATORS

The present invention relates to fuel quantity indicators and more particularly to digital type fuel quantity indicators. The present invention pertains to digital type fuel quantity indicators suitable for use with automobiles although not limited to such uses.

Commonly used fuel quantity indicators for automobiles are of analogue type comprising a float which is disposed in a fuel tank so as to be maintained a float in the liquid fuel and adapted to be connected with a potentiometer for varying the resistance thereof in accordance with the quantity of the fuel in the tank. In this type of fuel quantity indicator, it has been experienced that the mechanical connection between the float and the potentiometer has produced indication errors and that the potentiometer has not been able to provide a change in the resistance value in a reliable manner in response to a change in the fuel quantity. Further, conventionally used indicators such as those of bimetal type or of induction coil type cannot provide indications which are linearly proportional to the fuel quantity.

In the U.S. Pat. No. 3,242,731, there is disclosed a fuel sensing device which includes a variable resistor connected at one end with one end of a metal leaf spring curving upwardly away from the resistor and adapted to be deflected toward the resistor by means of a diaphragm which is responsive to the weight of fuel so that the resistance value of the resistor is varied in accordance with the quantity of fuel. In the U.S. Pat. No. 3,333,469, there is disclosed a fuel level sensing device in which fuel level is detected in the form of a change in an impedance value. However, it will be understood that neither of the arrangements as proposed by these patents is effective to eliminate the above disadvantages.

It is therefore an object of the present invention to provide a fuel quantity indicator for automobiles which is effective to eliminate the above disadvantages of prior art and can afford reliable indications of fuel quantity.

Another object of the present invention is to provide a digital type fuel quantity indicator which is simple in construction and reliable in operation.

A further object of the present invention is to provide a comparatively precise but less expensive fuel quantity indicator for automobile use.

Still further object of the present invention is to provide a digital type fuel quantity indicator which can afford more precise indications when the fuel quantity is less than a predetermined value.

Still further object of the present invention is to provide a digital type fuel quantity indicator which utilizes the same display means for indication of both larger and smaller figures.

According to the present invention, the above and other objects can be accomplished by a digital type fuel quantity indicator comprising means provided in fuel reservoir means for sensing level of fuel in said fuel reservoir means and producing binary signals in accordance with the level of fuel in said reservoir means, decoder means connected with said fuel level sensing means so as to receive said binary signals therefrom and produce display signals in accordance with the binary signals, display means connected with said decoder means to receive said display signals therefrom and provide appropriate digital display in accordance with the display signals. Preferably, the fuel level sensing means includes a plurality of stationary contact elements located in different levels in said fuel reservoir so that they represent different fuel levels and at least one movable contact element which is carried by float means in said fuel reservoir means and adapted to co-operate with said stationary contact elements. It should be noted, however, that the present invention may be embodied with a different type of fuel level sensing means.

According to a preferable aspect of the present invention, the fuel quantity indicator includes first fuel level sensing means for sensing the fuel level beyond a predetermined value such as 10 liters and producing binary signals representing at least one digit of higher unit such as one of 10 digits in accordance with the fuel level when said fuel level is above said predetermined value, and second fuel level sensing means for sensing the fuel level below said predetermined value and producing binary signals representing a digit of lower unit in accordance with the fuel level when said fuel level is below said predetermined value. More preferably, means may be provided for clearly indicating whether the display means is displaying the digit of higher unit or that of lower unit. Where the digit of higher unit is one of the 10 digits, the aforementioned indicating means may be zero digit display means which is located at the right side of the first mentioned display means and associated with a point-designating illuminator adapted to be energized only when said second fuel level sensing means is in operation.

The above and other objects and features of the present invention will become apparent from the following descriptions of a preferred embodiment taking reference to the accompanying drawings, in which:

FIG. 1 is a schematic diagram of a fuel quantity indicator in accordance with one embodiment of the present invention;

FIG. 2 is a vertical sectional view of a float type fuel level sensing device adopted in the indicator shown in FIG. 1; and FIG. 3 is a sectional view taken along the line III—III in FIG. 2.

Referring now to the drawings, there is shown in FIG. 1 a fuel reservoir R for automobiles having a fuel level sensing device 1 located therein. The sensing device 1 comprises a base board 3 vertically disposed in a casing 2. As shown in FIG. 1, the base board 3 has five terminals 7A, 7B, 7C, 7P and 7E. The terminal 7E is connected with a contact element 5E which extends between a position corresponding to a full reservoir level and a position corresponding to an empty level. The terminal 7P is connected with a contact element 5P extending between a position corresponding to the full reservoir level and a position corresponding to a predetermined level of fuel. In the illustrated embodiment, the full reservoir level is designated as 80 liter level and the predetermined fuel level is 10 liter.

The terminal 7A is connected with a series of contacts $5A_1$, $5A_2$, $5A_3$, $5A_4$, $5A_5$, $5A_6$ and $5A_7$. The contacts $5A_1$, $5A_2$, $5A_3$ and $5A_4$ are positioned at lower part of the base board 3 and extend between the empty and 1 liter levels, 2 and 3 liter levels, 4 and 5 liter levels, and 6 and 7 liter levels, respectively. The contact elements $5A_5$, $5A_6$ and $5A_7$ extend between 20 and 30 liter levels, 40 and 50 liter levels, and 60 and 70 liter levels, respectively.

The terminal 7B is connected with contact elements $5B_1$, $5B_2$, $5B_3$ and $5B_4$ which are connected in series.

The contact elements $5B_1$ and $5B_2$ extend between the empty and 2 liter levels, and 4 and 6 liter levels, respectively, while the contact elements $5B_3$ and $5B_4$ extend between 10 and 20 liter levels, and 40 and 60 liter levels, respectively. The terminal 7C is connected with contact elements $5C_1$ and $5C_2$ which are connected in series and extend between the empty and 4 liter levels, and 10 and 40 liter levels, respectively.

The fuel level sensing device 1 further includes a float assembly 6 which carries a plurality of movable contact elements 4A, 4B, 4C, 4P and 4E as shown in FIG. 3. The movable contact elements are disposed symmetrically with respect to the base board 3 at the both sides thereof. The movable contact elements at each side of the base board 3 are connected together by means of an electrically conductive element 4. The base board 3 has the patterns of the aforementioned contacts $5A_1$ through $5A_7$, $5B_1$ through $5B_4$, $5C_1$ and $5C_2$, 5P and 5E at each side thereof, so that the movable contact elements 4A, 4B, 4C, 4P and 4E co-operate with the stationary contacts at the both sides of the base board 3.

In use, the fuel level sensing device 1 is positioned in the fuel reservoir R as described before. Since the case 2 of the device 1 is formed with apertures 9 at the upper and lower portions thereof, liquid fuel in the reservoir R is introduced into the casing 2 and the heighwise position of the float assembly 6 and thus those of the movable contact elements are determined in accordance with the level of fuel in the reservoir R. The case 2 of the sensing device 1 is closed at the upper end by a closure 8 and fuel can move into and out of the case 2 only through the apertures 9, so that the case 2 has an effect of damping any abrupt change of the fuel level in the reservoir R. The closure 8 is provided with a connector 10 in which the terminals 7A, 7B, 7C, 7P and 7E are positioned.

The fuel quantity indicator further includes an indicator panel 11 which may be mounted for example on an instrument panel of an automobile. The indicator panel 11 has a pair of display tubes 12 and 13 which may be of seven-segment type having display segments arranged in the shape of figure eight as well as points 12P and 13P. The display tubes 12 and 13 are arranged in side-by-side relationship.

The display tube 12 is connected with a decoder 14 which has input terminals A, B, C and D and output terminals *a, b, c, d, e, f* and *g*. In the illustrated embodiment, the terminal D is grounded and only the terminals A, B and C are used so that one of the digits zero to seven can be displayed. The terminals 7A, 7B and 7C are connected with the terminals A, B and C, respectively. It is of course possible to provide a further series of stationary contact elements on the base board 3 of the sensing device 1 which may be connected with the terminal D on the decoder 14 for making it possible to display digits from zero to nine.

The terminals *a, b, c, d, e, f* and *g* of the decoder 14 are connected with corresponding terminals 12*a*, 12*b*, 12*c*, 12*d*, 12*e* and 12*f* on the display tube 12. The input terminals A, B and C of the decoder 14 correspond to the figure 1, 2 and 4, respectively. More particularly, the decoder 14 functions in such a manner that, when high level voltages are applied to the input terminals A, B and C thereof, output signals are produced at appropriate ones of the terminals *a* through *g* to make a display of figure 7, while figure 6 is displayed when the input terminals B and C are applied with high level voltages. Further, figure 5 is displayed when the input terminals A and C are subjected to high level voltages, figure 4 is displayed when only the input terminal C is subjected to a high level volage, and figure 3 is displayed when the terminals A and B are under high level voltages. Figures 1 and 2 are respectively displayed when the terminals A and B are subjected to high level voltages, while figure 0 is displayed when the terminals A, B and C are under low level voltages. The electrical connection is further such that the point 12P is always distinguished.

The second display tube 13 has input terminals 13*a*, 13*b*, 13*c*, 13*d*, 13*e* and 13*f* which are grounded so that FIG. 0 is always displayed. The display tube 13 further has a terminal 13*h* for energizing the point 13P.

A DC power source 17 is connected through a main switch 18 with the display tubes 12 and 13, and the decoder 14. Further, the power source 17 is also connected through resistors with the terminals A, B and C of the decoder 14. The terminal 13*h* of the display tube 13 is connected with an emitter of a transistor 15 which has a collector connected to ground. The base of the transistor 15 is connected through a resistor 16 with the power source 17. The base of the transistor 15 is further connected with the terminal 7P on the base board 3. The terminal 7E on the base board 3 is grounded.

In operation, when the fuel quantity is above 10 liters, the stationary contact 5P is connected through the movable contacts 4P and 4E with the grounded contact 5E. Thus, the base of the transistor 15 is grounded and the transistor 15 becomes non-conductive, whereby the point 13*p* is distinguished.

Assuming that the float assembly 6 is in such a level that the movable contacts are positioned between the levels of 50*l* and 60*l* as shown by a phantom line $L_1$ in FIG. 1, the terminal 7B is grounded through the contact $5B_4$, the movable contacts 4B and 4E and the contact 5E. Thus, a low level or ground level voltage is applied to the input terminal B of the decoder 14 while the terminals A and C are under high level voltage. Therefore, a digit 5 is displayed on the tube 12. Since the digit 0 is always displayed on the tube 13 and the point 13*p* is distinguished, a figure 50 is displayed on the panel 11.

As the fuel quantity is decreased below 10*l*, the movable contacts are lowered to a level, for example, as shown by a phantom line $L_2$ in FIG. 1. In this position, the movable contact 4P is moved apart from the contact 5P so that the grounding line of the transistor base is disconnected. Thus, the base voltage of the transistor 15 is increased and the transistor 15 becomes conductive. Therefore, the point 13*p* is illuminated. Since the terminal 7C is grounded at this position, a digit three is displayed on the display tube 12. Thus, a figure 3.0 is displayed on the panel 11.

In the illustrated embodiment, it is of course possible to distinguish the display of digit zero instead of energizing the point 13*p* under the fuel level below 10*l*.

According to the present invention, fuel level sensing means is provided in fuel reservoir means and produces binary signals in accordance with the fuel level in the reservoir means. Since such fuel level binary signals are thus directly obtained at the sensing means, it is possible to simplify the overall circuit. It is also possible according to the present invention to minimize the moving parts so that reliable operations can be ensured with simple mechanisms. In an arrangement where the same display means is used for displaying a digit of higher unit as well as a digit of lower unit in accordance with whether the fuel level is above a predetermined level or not, it is further possible to simplify the decoding means and the circuits associated therewith.

The invention has thus been shown and described with reference to a specific embodiments, however, it should be noted that the invention is in no way limited to the details of the illustrated arrangements but changes and modifications may be made without departing from the scope of the appended claims.

I claim:

1. Digital type fuel quantity indicator comprising means provided in fuel reservoir means for sensing level of fuel in said fuel reservoir means including a plurality of stationary contact elements located at different levels in said fuel reservoir so that they represent different fuel levels and at least one movable contact element which is carried by float means in said fuel reservoir means and adapted to cooperate with said stationary contact elements for producing binary signals in accordance with the level of fuel in said reservoir means, decoder means connected with said fuel level sensing means so as to receive said binary signals therefrom and produce display signals in accordance with the binary signals, and display means connected with said decoder means to receive said display signals therefrom and provide appropriate digital display in accordance with the display signals.

2. Digital type fuel quantity indicator comprising first fuel level sensing means for sensing the fuel level beyond a predetermined value and producing binary signals representing at least one digit of higher unit in accordance with the fuel level when said fuel level is above said predetrmined value, and second fuel level sensing means for sensing the fuel level below said predetermined value and producing binary signals representing a digit of lower unit in accordance with the fuel level when said fuel level is below said predetermined value, decoder means connected with said first and second fuel level sensing means so as to receive said binary signals therefrom and produce display signals in accordance with the binary signals, display means connected with said decoder means to receive said display signals therefrom and provide appropriate digital display in accordance with the display signals.

3. Digital type fuel quantity indicator in accordance with claim 2 which further includes means for indicating whether the displayed digit is for higher unit or lower unit.

4. Fuel quantity indicator in accordance with claim 2 in which said digit of higher unit is a 10 digit and said digit of lower unit is a unit digit, said display means including a pair of digital display devices which are arranged in side-by-side relationship, left side one of said display devices being connected with said decoder means and the right side one being adapted to display always zero digit, means being provided for displaying a point between said display devices when a digit of lower unit is to be displayed.

5. Fuel quantity indicator in accordance with claim 2 in which said digit of higher unit is a 10 digit and said digit of lower unit is a unit digit, said display means including a digital display device which is connected with said decoder means, and means being provided for displaying a zero digit at right side of said digital display device when a 10 digit is to be displayed on said device.

6. Fuel quantity indicator in accordance with claim 2 in which said fuel level sensing means includes a plurality of stationary contact elements located in different levels in said fuel reservoir so that they represent different fuel levels and at least one movable contact element which is carried by float means in said fuel reservoir means and adapted to co-operate with said stationary contact elements.

* * * * *